May 31, 1927.  
R. E. McCLEARY  
1,630,710  
HYDRAULIC BRAKE  
Original Filed June 3, 1924    2 Sheets-Sheet 1

INVENTOR  
Roy E. McCleary  
BY  
Carl H. Crawford  
ATTORNEY

May 31, 1927.  1,630,710

R. E. McCLEARY

HYDRAULIC BRAKE

Original Filed June 3, 1924  2 Sheets-Sheet 2

INVENTOR
Roy E. McCleary
BY
Carl M. Crawford
ATTORNEY

Patented May 31, 1927.

1,630,710

UNITED STATES PATENT OFFICE.

ROY E. McCLEARY, OF SEATTLE, WASHINGTON, ASSIGNOR TO McCLEARY HYDRAULIC BRAKE COMPANY, A CORPORATION OF WASHINGTON.

HYDRAULIC BRAKE.

Application filed June 3, 1924, Serial No. 717,521. Renewed December 18, 1926.

This invention relates to improvements in braking mechanism for motor vehicles and preferably for worm driven vehicles primarily of the heavy duty type, and the invention is especially addressed to a hydraulic type of such mechanism.

As the rear axle housing is by far the strongest portion of the rear end of a truck, it is a feature of my invention to mount my improved brake mechanism wholly upon and to the rear axle housing.

A further feature of my invention is to operatively connect my brake mechanism directly to the worm drive and preferably to the worm member of the drive thereby localizing the entire braking thrust to the rear axle housing and the worm drive and eliminating from the engine, the drive shaft, the universal joint, and other coacting entities, all the braking thrusts that have heretofore been applied thereto.

My improved brake involves a structure providing an endless path for the oil or other brake controlling liquid and into which is interposed a piston adapted to be retarded in its movement by restriction of the liquid flow, and one of the main features of this phase of the invention is the interposition of valves close to the cylinder for controlling the movement of the liquid at each end of the cylinder whereby no liquid slack, with its known operative defects, can possibly result.

A further feature consists in providing liquid containing chambers at each end of the cylinder so that when the piston has reached its extreme endwise positions there will always be a body of liquid on opposite sides or rather ends of the piston as a further prevention of liquid slack and consequent lost motion.

A further feature consists in means for causing the valves to operate in absolute unison both in closing and opening movements thereof.

My invention has many other features and objects which will be more fully described in connection with the accompanying drawings and which will be more particularly pointed out in and by the appended claims.

In the drawings:—

Like characters of reference designate similar parts throughout the different figures of the drawings.

Figure 1:
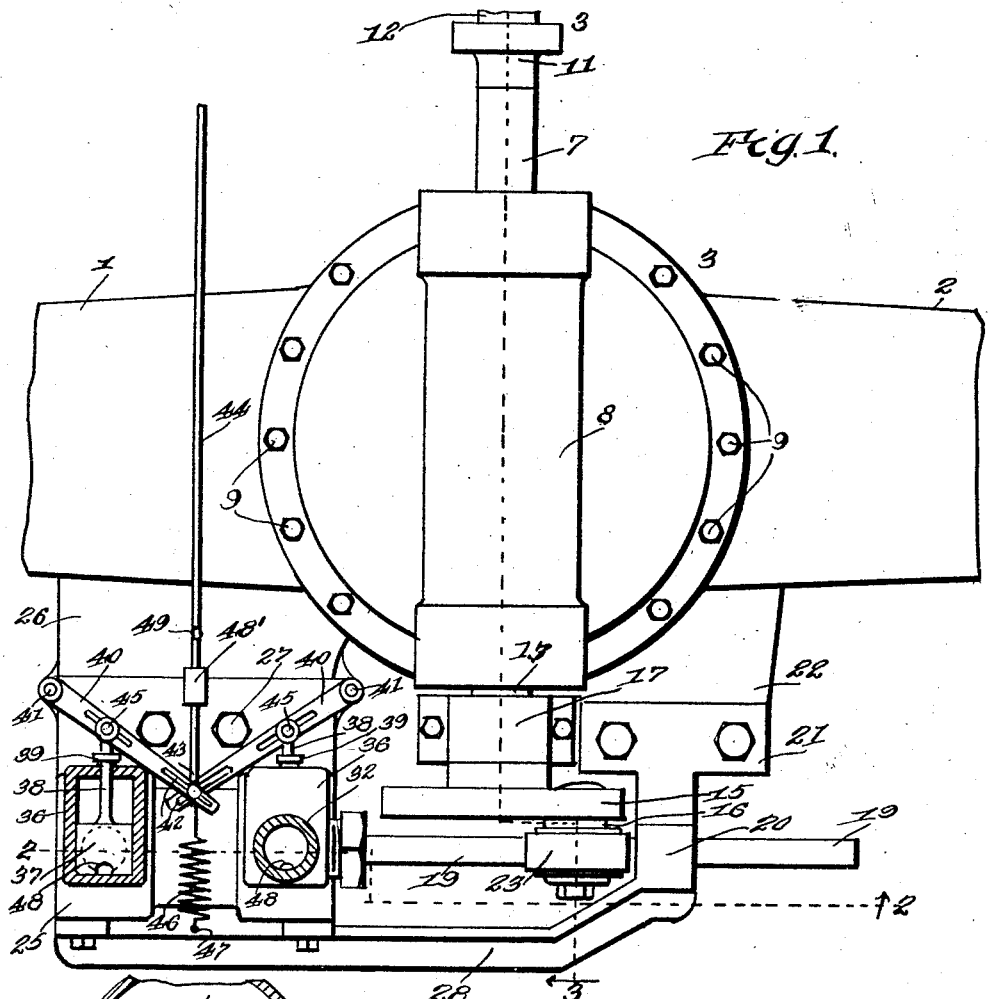
Fig. 1, is a plan view, partly in section, of the central portion of the rear end axle housing showing the device of my invention applied thereto.
Figure 2:
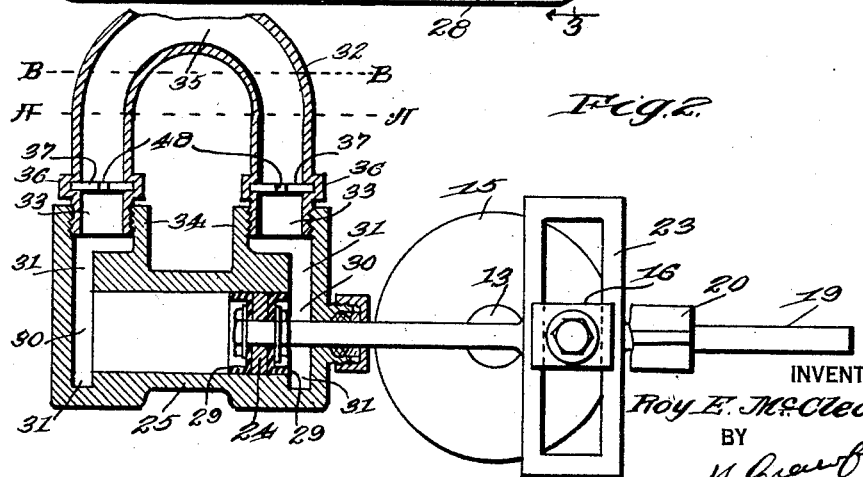
Fig. 2, is a sectional view on line 2—2 of Fig. 1.
Figure 3:
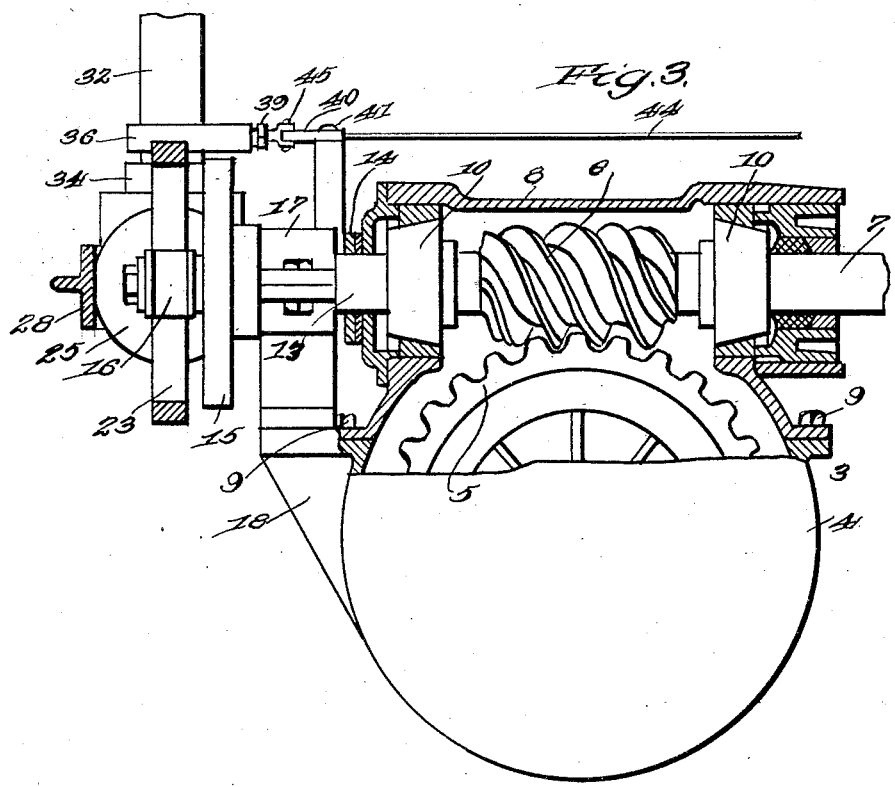
Fig. 3, is a sectional view, partly in elevation, on line 3—3 of Fig. 1.

As shown, 1 and 2 designate the limbs of the rear axle housing extending laterally from the central drive enclosing portion 3. This central portion 3, comprises a lower section 4, in which is suitably journalled a worm wheel 5, the latter being equipped with the usual differential connection with rear axles, not shown. A worm 6, meshes with wheel 5, and is mounted on a worm shaft 7. The upper section of the worm housing is indicated at 8, and may be suitably bolted to the lower section 4, as shown, at 9. The section 8, of said housing is provided with end thrust bearings 10, in which worm shaft 7 is journalled so that the entire stress imposed on said worm is sustained by the axle housing, broadly speaking. The forward end of shaft 7, is connected by a universal joint 11, with drive shaft 12. The rear end 13, of shaft 7, is usually encased by the corresponding end of housing 8, but in accordance with my invention, I extend this end 13, through a suitable dust and oil proof or tight joint 14, which may be of any desired form. On the outer or rearmost end, I fixedly mount a vehicle driven element which may be a crank member 15, which is shown in the form of a crank disc, and to which is swivelled a cross head 16. In order to steady the projecting end 13, I provide the same with a bearing 17, which may be suitably mounted on a bracket 18, formed on or secured to the axle housing. This bearing, although not essential, serves to relieve thrust bearing 10 of stresses that might otherwise be imposed thereon.

I will next describe in detail, what more particularly constitutes my improved brake mechanism, inclusive of the above named attachments and modifications of the axle housing.

A driven brake member shown in the form of a linearly reciprocating piston rod is designated at 19, and one one side of worm 6, or the axis thereof, said rod 19 is supported by a bearing 20, which may be mounted at 21, on a bracket 22, extending from the axle housing. Said rod 19, is interrupted between its ends and has rigidly incorporated therein, a cross head guide frame 23, in which cross head 16 reciprocates as member 15 rotates and by means of which connection, reciprocating movement is imparted to rod 19. The opposite end of rod 19 is provided with a piston 24 adapted to reciprocate in a cylinder 25, the latter forming a bearing for the remaining end of rod 19. A bracket 26, projecting laterally from the axle housing forms a support for attachment of cylinder 25, at 27. I preferably stiffen the structure just described by extending a bracing arm 28, from cylinder 25, to bearing 20, as clearly shown in Fig. 1.

I will next describe, more particularly, the construction and functions of the cylinder 25, and its associated parts.

It may be stated that the piston 24, is provided with oppositely facing packing cups 29, so that in either direction of travel of the piston, leakage passed the same will be prevented. I have shown the piston 24, at one extreme position. Now it will be noted that cylinder 25, is of such length, that in either extreme position of the piston, there will be a space between the end of the piston and the correspondingly nearest end thereof of the cylinder. If oil, is the liquid employed, or otherwise, it will be clear that each end of the cylinder has a chamber, which I will designate at 30, from which oil will not be entirely expressed by the piston in either extreme position of the latter. In order not unduly to lengthen the cylinder 25, and at the same time increase the areas of these chambers, I preferably enlarge the internal diameter of the cylinder 25, as shown at 31. This affords chambers 30 with a correspondingly greater containing area. In the specific construction shown, cylinder 25 forms part of an endless circuit of which the remaining part is constituted by circulating pipe 32. In the construction shown, and with certain material advantages, the pipe 32 is in the form of an inverted U. The lower ends 33, are threaded into bosses 34 which communicate with chambers 30. With this construction, oil cannot stalemate in the bight 35 as it must flow by gravity and downwardly toward the cylinder 25 either through one limb or the other of pipe 32. Thus, while it may be advantageous to have a quantity of liquid completely filling the apparatus in order to prevent slack, still, with this construction, the initially full body of liquid might decrease in volume, as a result of slight leakage or evaporation, and yet, the device would perform its full braking function. This is due both to the form of the circulating pipe 32, and the fact that it is vertically disposed, or on a vertical plane above the cylinder 25.

I will next describe the improved means for controlling the oil or liquid in order to cause the latter to retard movement of piston 24.

In each leg or limb 32, is interposed a valve which may be of any suitable construction, the valves shown being of the gate type. Merely for purposes of illustration, I have shown the limbs provided with valve casings 36 each having a gate closure 37. Each gate closure is provided with a stem 38, extending through packing glands 39, with which each casing 36 is equipped. Valve operating levers 40, are suitably pivoted at 41, at their outer ends. The inner ends are slotted at 42 and are disposed in crossed relation, as shown. A pivot shackle 43, slidably connects the slotted inner ends of said levers and said shackle 43 is connected with a rod or cable 44, which extends forwardly to the front end of the truck (not shown) into a position accessible to the driver. The stems 38, have pivotal connection with said levers at 45, at which points the levers are suitably slotted to compensate for the linear movement of the stems 38 and the swinging movement of the levers 40. Means such as a spring 46, has one end connected with shackle 43, and the other end connected with any stationary part as indicated at 47. In the adjustment shown, this spring acts to hold the valves 37 in a closed position thereby applying braking action. When the driver wants to release the braking action, he exerts a pull on rod 44, to the desired extent. As a precaution against complete closure or rather to prevent the valves from completely shutting off the circulation of the liquid, I provide the gates with openings or notches 48, which would afford a slight passage of liquid passed an otherwise fully closed valve to avoid disruption that might occur to packing and relieve the same of an abnormal pressure that would be imposed if the valves were suddenly and fully closed.

It will be noted that with the construction shown, the valves are bound to be opened in exact unison, and closed in unison. Should there develop any play that might afford other than a unison movement of the valves, a bearing 48', may be provided for the shackle to hold the latter to a straight linear path of travel. I have shown the shackle pivoted to rod 44, at 49, in advance of the bearing 48'.

I do not wish to be limited to the arrangement shown wherein the spring 46 acts to close the valves, as in some constructions, this arrangement might desirably be reversed and still be within the purview of my invention.

Further, in practice, with the construction shown, the driver when leaving his truck, could release rod 44, from whatever detent was provided, and would be sure that his truck was locked against movement until he returned. It will also be seen that a reliable spring for closing movement of the valves, affords assurances of safety which would not be afforded by reliance on the human element requiring manual or pedal actuation of the brakes. Thus, it will be clear that certain advantages result from this construction wherein the rod 44 is released for movement by spring 46, in order to apply the brakes. Of course, the degree of application of the brakes would depend upon the extent to which rod 44 was released. However, in any event, it is a distinct feature of my invention to provide a plurality of valves for controlling movement of liquid for resisting movement of a brake applying piston.

It will be noted that the valves are relatively closely disposed toward the cylinder 25. The advantage of this disposition is that a more responsive action necessarily results, than if the valves 37 were in a more remote position or relation with respect to the cylinder. Suppose that the piston 24, was in a longitudinally central position in the cylinder 25, and the liquid had either leaked out, or was down to a level indicated by dotted line A—A. Then, and in that event, with the vertical position of the U-pipe 32, and the valve for each limb thereof, the mechanism would work just as well as though the level were at line B—B or entirely full. This is true for the reason that in each end of the cylinder, the oil will descend by gravity following receding movement of piston 24 and will not have to be forced to follow the piston. Hence no "slack" of oil can occur thereby preventing jerky action of the brake. In other words, with the arrangement shown, and even with the oil at level B—B, the cylinder will always be full of oil on both sides of piston 24, irrespective of the position of the latter. Therefore, with my improved construction, it is not essential that a complete circuit be provided for the oil. I deem it to be within the scope of my invention if each limb 33, terminated at dotted line A—A or B—B and were closed at their ends and not connected at all by bight 35. Thus, when I hereinafter speak of end chambers, in the appended claims, I wish it understood that I am defining end chambers, valve controlled, and extending, preferably but not necessarily, above the actual chambers indicated by numerals 30. However, it is a preferred construction to provide connected limbs 33, as by the bight 35, and in actual practice, I prefer to fill the endless circuit completely full of whatever liquid is to be employed.

While I have shown one specific form of my invention, I do not wish to be limited thereto except for such limitations as the claims may import.

I claim:—

1. In combination, a vehicle worm drive having the worm shaft extended through the rear axle housing, a crank member on said extended shaft, and brake mechanism mounted on said housing and operatively connected with said crank member.

2. In combination, a vehicle worm drive having a worm shaft extension projecting rearwardly through the rear axle housing, a crank member mounted on said extension, and reciprocating brake mechanism operatively connected with said extension and mounted on said housing with its reciprocating path substantially parallel with said housing.

3. In combination, a vehicle worm drive having a worm shaft extension projecting through the rear of the axle housing, a crank member mounted on said extension, a bearing exterior of said housing and journalling said worm shaft between said crank member and said housing, and break mechanism mounted on said housing and operatively connected with said crank member.

4. A hydraulic brake comprising in combination, a driven shaft having a member driven thereby, a piston rod connected with said member to be reciprocated thereby and having a piston, a cylinder in which said piston reciprocates and said cylinder being of sufficient length with respect to the length of stroke of said piston to afford liquid storage chambers between the ends of said cylinder and the ends of said piston when the latter reaches its endmost positions, and means beyond said storage chambers for controlling the liquid to resist movement of said piston.

5. A hydraulic brake comprising in combination, a driven shaft having a member driven thereby, a substantially horizontally reciprocating piston rod connected with said member to be reciprocated thereby and having a piston, a substantially horizontally disposed cylinder in which said piston reciprocates, an upright circulating pipe having its ends connected with the ends of said cylinder at the upper periphery of said cylinder whereby the liquid will always flow into said cylinder by gravity, and a valve in each pipe end close to said cylinder for controlling movement of the liquid to resist movement of said piston.

6. A hydraulic brake comprising in combination a driven shaft having a member driven thereby, a piston rod reciprocated by said member and having a piston, a cylinder in which said piston reciprocates and adapted to contain a liquid, and said cylinder having end chambers extending upwardly from the ends of said cylinder for storage of the liquid, and a valve in each chamber and close to said cylinder for controlling movement of the liquid in such close relation to said cylinder that liquid slack cannot occur.

7. A hydraulic brake comprising in combination, a driven shaft having a member driven thereby, a piston rod reciprocated by said member and having a piston, a cylinder for said piston having an upright inverted U-shaped circulating pipe with the ends of said pipe opening to the ends of said cylinder at the upper periphery thereof whereby all of the liquid in said pipe will always flow by gravity toward said cylinder, a valve in each end of said pipe close to said cylnder, and means for opening and closing said valves in unison.

8. A hydraulic brake comprising in combination, a driven shaft having a member driven thereby, a piston rod reciprocated by said member and having a piston, a cylinder for said piston having a circulating pipe opening to the ends of said cylinder, a plurality of valves in said pipe for controlling the movement of the liquid, means normally acting to close said valves, and means for opening said valves.

9. In combination, a vehicle worm drive having its worm shaft projecting rearwardly through the axle housing, a crank member on the projecting end of said shaft, a cross head swivelled on said member, a linearly movable piston rod having a guide frame for said cross head, a bearing mounted on one side of said member and to said housing for supporting and guiding one end of said piston rod, a cylinder mounted on said housing on the remaining side of said member for guiding the remaining end of said rod and the latter having a piston in said cylinder, and means for resisting movement of said piston to retard said worm.

10. A hydraulic brake comprising in combination, a driven shaft having a member driven thereby, a piston rod reciprocated by said member and having a piston, a cylinder for said piston having a circulating pipe opening to the ends of said cylinder, a slide valve interposed in said pipe at each end of said cylinder, pivoted levers slidably connected with said valves and slidably connected with each other, a spring normally acting to move said valves into one position, and means for moving said valves into another position.

11. In combination, a vehicle, a hydraulic brake mechanism therefor including vehicle driven means and pressure chambers in coacting relation therewith, and means for egressing oil from said chambers.

In testimony that I claim the foregoing as my own, I hereby affix my signature.

ROY E. McCLEARY.